(12) United States Patent
Kerber (10) Patent No.: US 8,104,466 B2
(45) Date of Patent: Jan. 31, 2012

(54) SOLAR ENERGY COLLECTING ASSEMBLY FOR A SOLAR ENERGY CONVERTER (76) Inventor: Tom Kerber, Ontario (CA)

( * ) Notice: Subject to any disclaimer, the term of this patent is extended or adjusted under 35 U.S.C. 154(b) by 339 days.

(21) Appl. No.: 12/200,290

(22) Filed: Aug. 28, 2008

(65) Prior Publication Data
US 2009/0056702 A1 Mar. 5, 2009

Related U.S. Application Data (60) Provisional application No. 60/935,735, filed on Aug. 29, 2007.

(51) Int. Cl.
F24J 2/24 (2006.01)

(52) U.S. Cl. ........ 126/658; 126/660; 126/907; 165/151; 165/181; 165/183; 165/48.2

(58) Field of Classification Search .................. 126/658, 126/660; 165/151, 181, 183, 48.2, DIG. 201, 165/DIG. 346, DIG. 442, DIG. 518
See application file for complete search history.

(56) References Cited

U.S. PATENT DOCUMENTS

| 1,737,759 | A | * | 12/1929 | Harter | 110/326 |
|---|---|---|---|---|---|
| 1,744,074 | A | * | 1/1930 | Gortner | 165/184 |
| 1,890,625 | A | * | 12/1932 | Shaw | 165/131 |
| 1,928,639 | A | * | 10/1933 | Berg | 136/201 |
| RE19,502 | E | * | 3/1935 | Gortner | 165/184 |
| 2,032,065 | A | * | 2/1936 | Modine | 165/151 |
| 2,171,790 | A | * | 9/1939 | Higham et al. | 62/516 |
| 2,286,271 | A | * | 6/1942 | Higham | 165/149 |
| 2,294,030 | A | * | 8/1942 | Higham et al. | 165/149 |
| 2,519,820 | A | * | 8/1950 | Bruegger | 29/890.07 |
| 3,269,459 | A | * | 8/1966 | Popovitch | 165/140 |
| 3,529,662 | A | * | 9/1970 | Roe | 165/111 |
| 3,719,207 | A | * | 3/1973 | Takeda | 366/181.5 |
| 3,746,525 | A | * | 7/1973 | Kasuga et al. | 5/512 |
| 4,054,124 | A | * | 10/1977 | Knoos | 126/584 |
| 4,106,555 | A | * | 8/1978 | Quintal | 165/45 |
| 4,131,159 | A | | 12/1978 | Long | |
| 4,186,033 | A | * | 1/1980 | Boling et al. | 136/247 |
| 4,222,373 | A | * | 9/1980 | Davis | 126/664 |
| 4,237,971 | A | * | 12/1980 | Olsson et al. | 165/171 |
| 4,284,072 | A | * | 8/1981 | McKaveney | 126/661 |
| 4,311,131 | A | * | 1/1982 | Sabat | 126/637 |
| 4,313,430 | A | * | 2/1982 | Britner et al. | 126/659 |
| 4,324,028 | A | * | 4/1982 | Severson | 29/890.033 |
| 4,326,583 | A | * | 4/1982 | Rudd | 165/183 |
| 4,343,350 | A | * | 8/1982 | Campbell et al. | 165/11.1 |
| 4,368,726 | A | * | 1/1983 | Ellsworth | 126/667 |
| 4,382,468 | A | * | 5/1983 | Hastwell | 165/173 |
| 4,459,976 | A | | 7/1984 | Speros | |

(Continued)

FOREIGN PATENT DOCUMENTS

JP 59122851 A * 7/1984

Primary Examiner — Kenneth Rinehart
Assistant Examiner — Jorge Pereiro
(74) Attorney, Agent, or Firm — Martin Fleit; Paul D. Bianco; Fleit Gibbons Gutman Bongini & Bianco PL (57) ABSTRACT A solar energy collecting assembly useful for transferring solar heat to a heat utilizing system via heat transfer fluid flow, comprising anisotropic graphite sheets coupled to a pipe containing heat transfer fluid, and various configurations and embodiments. Methods useful for extracting collected solar heat and transferring said heat to a heat transfer medium.

3 Claims, 8 Drawing Sheets

U.S. PATENT DOCUMENTS

| | | | |
|---|---|---|---|
| 4,505,261 A * | 3/1985 | Hunter | 126/635 |
| 4,513,732 A * | 4/1985 | Feldman, Jr. | 126/570 |
| 4,541,411 A * | 9/1985 | Woolf | 126/390.1 |
| 4,763,727 A * | 8/1988 | Kreuzer et al. | 165/171 |
| 4,854,382 A | 8/1989 | Funke | |
| 5,473,905 A * | 12/1995 | Billman | 62/50.2 |
| 5,487,424 A | 1/1996 | Davison | |
| 5,572,987 A * | 11/1996 | Moratalla et al. | 126/652 |
| 5,806,803 A * | 9/1998 | Watts | 244/171.8 |
| 6,771,502 B2 | 8/2004 | Getz, Jr. et al. | |
| 7,121,002 B1 * | 10/2006 | Roth | 29/890.039 |
| 2004/0001317 A1 * | 1/2004 | Getz et al. | 361/703 |
| 2006/0237178 A1 * | 10/2006 | Katoh et al. | 165/153 |
| 2006/0289000 A1 * | 12/2006 | Naylor | 126/96 |
| 2007/0015267 A1 * | 1/2007 | Da Silva et al. | 435/182 |
| 2007/0144711 A1 | 6/2007 | Rausing | |
| 2007/0158050 A1 | 7/2007 | Norley et al. | |
| 2007/0262073 A1 * | 11/2007 | Naylor | 219/473 |
| 2008/0000435 A1 * | 1/2008 | Baer et al. | 122/367.3 |
| 2008/0272106 A1 * | 11/2008 | Naylor | 219/213 |
| 2009/0217991 A1 * | 9/2009 | Kondo et al. | 137/561 A |

* cited by examiner

SOLAR ENERGY COLLECTING ASSEMBLY FOR A SOLAR ENERGY CONVERTER

CROSS REFERENCE TO RELATED APPLICATION

This application is a non-provisional patent application claiming benefit under 35 U.S.C. §119(e) of U.S. Provisional Application No. 60/935,735, filed Aug. 29, 2007, the entire contents of which are hereby expressly incorporated by reference into this disclosure as if set forth fully herein.

FIELD OF THE INVENTION

This invention relates to energy converters and more particularly to solar energy collectors.

BACKGROUND OF THE INVENTION

A solar collector is a device for extracting the energy of the sun directly into a more usable or storable form. The energy in sunlight is in the form of electromagnetic radiation from the infrared (long) to the ultraviolet (short) wavelengths. The solar energy striking the earth's surface at any one time depends on weather conditions, as well as location and orientation of the surface, but overall, it averages about 1000 watts per square meter on a clear day with the surface directly perpendicular to the sun's rays.

A solar thermal collector that stores heat energy is called a "batch" type system. Other types of solar thermal collectors do not store energy but instead use fluid circulation (usually water or antifreeze solutions or refrigerants) to transfer the heat for direct use or storage in an insulated reservoir. Heat transfer medium/glycol has a high thermal capacity and is therefore convenient to handle. The direct radiation is captured using a dark colored surface which absorbs the radiation as heat and conducts it to the transfer fluid. Metal makes a good thermal conductor, especially copper and aluminum.

The fluid carries away the absorbed heat, thus cooling the absorber. The warmed fluid leaving the collector is either directly stored, or else passes through a heat exchanger to warm another tank of heat transfer medium, or is used to heat a building directly.

The transfer of heat is normally from a high temperature object to a lower temperature object. Classical transfer of thermal energy occurs only through conduction, convection, radiation or any combination of these. Conduction can be defined as a transfer of heat by electron diffusion or phonon vibrations, convection as a transfer of heat by conduction in a moving medium, such as a fluid, and radiation as a transfer of heat by electromagnetic radiation or, equivalently, by photons.

Conduction is heat transfer without any motion of the material as a whole. If one end of a metal rod is at a higher temperature, then energy will be transferred from a hot part of a body toward a colder one because the higher speed particles will collide with the slower ones with a net transfer of energy to the slower ones. For heat transfer between two plane surfaces, such as heat loss through the wall of a house, the rate of conduction heat transfer is:

$$\frac{Q}{t} = \frac{kA(T_{hot} - T_{cold})}{d}$$

Q is heat transferred in time t, k is thermal conductivity of a thermal conductor, A is an area of a body cross section, $T_{hot}$ and $T_{hot}$ are temperatures of hot and cold edges of the body, respectively, d is a distance between hot and cold edges.

The design concept used for heating and cooling systems is similar. Materials with high thermal conductivity are used in both systems.

U.S. Pat. No. 4,459,976 discloses a heat exchanger/solar collector. An absorbing element is a thin radiation-absorbing layer composed of particles of crystalline graphite in light-transparent plate-type container. Heat-removing results from heat transfer medium flowing between particles of crystalline graphite.

US Application 2007/0158050 teaches a microchannel heat sink made of graphite material. A heat sink member has a plurality of microchannels formed therein for carrying heat transfer medium heat transfer medium. The each microchannel has a length parallel to outer surfaces of the heat sink member.

These two technical solutions have similar disadvantages in terms of application of them in solar heat collecting devices. The solar heat collector taught in '976, requires quite powerful heat removal (in terms of watts) and consequently large heat transfer medium flow. The heat sink solution taught in '050 suggested for smaller bodies such as electronic components uses microchannels to cool the body. Microchannels provide, however high resistance to fluid flow. Thus both of the above mentioned technical solutions are not optimally effective for use in solar heat collecting devices. Additionally, the microchannel devices are likely to fail in long-term usage because they will become clogged by dissolved salts in circulating heat transfer medium.

Graphite sheets are a potentially useful material, due to their anisotropic properties, specifically anisotropic thermal conductivity. Thermal conductivity of graphite sheets in a direction parallel to the crystallographic plane is several-fold higher in comparison with other directions.

Anisotropy in thermal conductivity of graphite sheets is used in a heat sink made of longer and shorter graphite sheets, see U.S. Pat. No. 6,771,502. A heat sink apparatus comprises alternating longer and shorter sheets of graphite material sandwiched together such that the longer sheets extend beyond the shorter sheets to define fins. The directions of higher thermal conductivity of the anisotropic graphite material are oriented in the plane of the sheet. The longer and shorter sheets have base ends aligned together to define a generally planar base surface for engaging an electronic device to be cooled.

The heat sink cooling taught in '502 is implemented by air convection which is the least effective type of heat transfer. Additionally, graphite sheets are attached to the cooled surface by means of end face surfaces of graphite sheets only. Enhancement of the area of thermal contact would facilitate an increased heat transfer rate.

An efficient means and method of extraction of converted heat from solar collecting devices is hence still a long felt need.

SUMMARY OF THE INVENTION

It is hence one object of the invention to disclose a solar energy collecting assembly for a solar energy converter comprising at least one graphite sheet and at least one pipe coupled to a heat utilizing system. An end face surface of the graphite sheet thermally attached to a surface of the pipe. A heat utilizing system is adapted to extract collected solar heat by means of circulation of a heat transfer medium. It is a core disclosure of the invention to disclose a pipe furnished with slit-like ports adapted to hold a crenulated or other conveniently shaped edge of the graphite sheet.

The comb-type edge elements protrude into the pipe and provide thermal contact with higher efficiency due to additional turbulence inside the pipe.

Another object of the invention disclosed herein is a device wherein the thermal transfer medium is water.

Another object of the invention is to disclose a solar energy collecting assembly for a solar energy converter comprising at least one graphite sheet and at least one pipe coupled to a heat utilizing system. An end face surface of the graphite sheet is thermally attached to a surface of the pipe. The heat utilizing system is adapted to extract collected solar heat by means of circulation of a heat transfer medium. It is in the core of the invention wherein the pipe has at least invagination located along the pipe and adapted to hold the graphite sheet.

Another object of the invention is to disclose a solar energy collecting assembly for a solar energy converter comprising at least one graphite sheet and at least one pipe coupled to a heat utilizing system. The heat utilizing system is adapted to extract collected solar heat by means of circulation of a heat transfer medium. It is in the core of the invention wherein a heat transfer adaptor is disposed between the pipe and the graphite sheet; the adaptor has a plurality of pins penetrating into the graphite sheet and providing a thermal contact between the graphite sheet and the adaptor.

Another object of the invention is to disclose a thermal device for heating and/or cooling surrounding air comprising at least one graphite sheet and at least one pipe coupled to a heating and/or cooling system. A thermal device further comprises an end face surface of the graphite sheet thermally attached to a surface of the pipe. The heating and/or cooling system is adapted to extract heat from the graphite sheet and provide heat the graphite sheet by means of circulation of a thermal transfer medium. It is in the core of the invention wherein the pipe is furnished with slit-like ports adapted to hold a crenulated edge (or any other conveniently shaped edge) of the graphite sheet such that elements of the crenulated edge protrude into the pipe providing thermal contact with higher efficiency due to additional turbulence inside the pipe.

Another object of the invention is to disclose a thermal device for heating and/or cooling surrounding air comprising at least one graphite sheet and at least one pipe coupled to a heating and/or cooling system. A thermal device further comprises an end face surface of said graphite sheet thermally attached to a surface of the pipe. The heating-cooling system is adapted to extract heat from the graphite sheet and provide heat to the graphite sheet by means of circulation of a thermal transfer medium. It is in the core of the invention wherein the pipe has at least one invagination disposed along the pipe and adapted to hold the graphite sheet.

Another object of the invention is to disclose a thermal device for heating and/or cooling surrounding air comprising at least one graphite sheet and at least one pipe coupled to a heating and/or cooling system. A thermal device further comprises an end face surface of the graphite sheet thermally attached to a surface of the pipe. The heating and/or cooling system is adapted to extract heat from the graphite sheet and provide heat to the graphite sheet by means of circulation of a thermal transfer medium. It is in the core of the invention further wherein a heat transfer adaptor is disposed between the pipe and the graphite sheet. The adaptor has a plurality of pins penetrating into the graphite sheet and providing a thermal contact between the graphite sheet and the adaptor.

Another object of the invention is to disclose a solar energy collecting assembly for a solar energy converter constituting plane housing and comprising metal and plastic plates disposed in parallel against each other and sealed along their perimeter. The housing has input and an output ports coupled to a heat utilizing system for inflowing and outflowing the heat transfer agent. The heat conducting metal plate is coated with a coating for absorbing solar rays. It is in the core of the invention wherein the plastic plate has grooves extruded on the inner side. The groves provide passages for the heat transfer agent. A surface of the grooves is sufficiently rough to provide turbulence in a flow of the heat transfer agent.

Another object of the invention is to disclose a solar energy collecting assembly for a solar energy converter constituting plane housing and comprising metal and plastic plates disposed in parallel against each other and sealed along their perimeter. The housing has input and an output ports coupled to a heat utilizing system for inflowing and outflowing heat transfer agent. The heat conducting metal plate is coated with a coating absorbing solar rays. It is in the core of the invention wherein graphite spacers are disposed between the plastic and metal plates; the graphite spacers are adapted to provide passages for the heat transfer agent; the plastic plate has sufficiently roughness adapted to provide turbulence in a flow of the heat transfer agent.

Another object of the invention is to disclose a solar energy collecting assembly for a solar energy converter constituting plane housing and comprising two heat conducting metal plates disposed in parallel against each other and sealed along their perimeter.

The housing has an input and an output ports coupled to a heat utilizing system for inflowing and outflowing heat transfer agent; at least one heat conducting metal plates is coated with a coating absorbing solar rays. It is in the core of the invention wherein graphite spacers are disposed between the metal plates; the graphite spacers are adapted to provide passages for said heat transfer agent.

Another object of the invention is to disclose a solar energy collecting assembly for a solar energy converter constituting plane housing and comprising two graphite sheets disposed in parallel against each other and sealed along their perimeter. The housing has an input and an output ports coupled to a heat utilizing system for inflowing and outflowing heat transfer agent. It is in the core of the invention wherein graphite sheets have grooves adapted to provide passages for said heat transfer agent.

Another object of the invention is to disclose an improved solar energy collecting assembly for a solar energy converter comprising at least one solar energy collecting element and at least one pipe coupled with a heat utilizing system in thermal contact with said solar energy collector wherein improvement comprises usage of a graphite sheet as said solar energy collecting element; said pipe is furnished with slit-like ports adapted to hold a crenulated (or any other conveniently shaped edge) edge of the graphite sheet. Elements of the crenulated edge penetrate into the pipe and provide thermal contact with higher efficiency due to additional turbulence of flow of a thermal carrier medium inside said pipe.

Another object of the invention to disclose an improved solar energy collecting assembly for a solar energy converter comprising at least solar energy collecting element and at least one pipe coupled with a heat utilizing system in thermal contact with the solar energy collector. It is in the core of the invention wherein improvement comprises usage of a graphite sheet as the solar energy collecting element. The pipe is furnished with slit-like ports adapted to hold a crenulated (or any other convenient shape) edge of the graphite sheet; elements of the crenulated edge penetrate into the pipe and provide a thermal contact with higher efficiency due to additional turbulence of flow of a thermal carrier medium inside the pipe.

A further object of invention is to disclose an improved solar energy collecting assembly for a solar energy converter comprising at least solar energy collecting element and at least one pipe coupled with a heat utilizing system and thermal contacted with the solar energy collector. It is in the core of the invention wherein improvement comprises usage of a graphite sheet as the solar energy collecting element. The pipe has at least one invagination disposed along the pipe and adapted to hold the graphite sheet.

Another further object of invention is to disclose an improved solar energy collecting assembly for a solar energy converter comprising at least solar energy collecting element and at least one pipe coupled with a heat utilizing system in thermal contact with the solar energy collector. It is in the core of the invention wherein an embodiment comprises usage of a graphite sheet as the solar energy collecting element; a heat transfer adaptor is disposed between the pipe and the graphite sheet; the adaptor has a plurality of pins penetrating into the graphite sheet and providing a thermal contact between the graphite sheet and the adaptor.

Yet another object of invention is to disclose a method useful for extracting collected solar heat and transferring the heat to a heat transfer medium comprising steps of
 a. obtaining at least one graphite sheet, the sheet anisotropically conductive along the crystalline plane,
 b. shaping at least one edge of graphite sheet to a crenulated shape (or any other convenient shape),
 c. obtaining at least one pipe,
 d. furnishing the pipe with slit like ports so as to accommodate the crenulated shape of graphite sheet.
 e. attaching the graphite sheet crenulated edge to the pipe such that a portion of the crenulations protrude into the pipe interior, further;
 f. providing the attachment with appropriate thermal contact,
 g. coupling the pipe to heat utilization system,
 h. circulating a heat transfer medium through the pipe, the pipe thereby extracting the collected solar heat and transferring it to the heat utilization system.
 i. coupling the pipe to a heat utilizing system.

A still further object of invention is to disclose a method useful for extracting collected solar heat and transferring said heat to a heat transfer medium comprising steps of
 a. obtaining at least one graphite sheet, the sheet anisotropically conductive along crystalline plane,
 b. obtaining at least one pipe,
 c. furnishing said pipe with at least one invagination located along Further another object of invention is to disclosure pipe,
 d. attaching the graphite sheet to pipe such that an edge of graphite sheet protrudes into the invagination, further;
 e. providing the attachment with appropriate thermal contact,
 f. coupling the pipe to heat utilization system,
 g. circulating a heat transfer medium through the pipe, the pipe thereby extracting the collected solar heat and transferring it to the heat utilization system.
 h. coupling the pipe to a heat utilizing system.

Lastly, another object of invention is to disclosure a method useful for extracting collected solar heat and transferring the heat to a heat transfer medium, wherein the method comprises steps of
 a. obtaining at least one graphite sheet, the sheet anisotropically conductive along crystalline plane,
 b. obtaining at least one pipe,
 c. obtaining an adaptor furnished with a grip and a plurality of pins,
 d. attaching the adaptor to said graphite sheet such that the plurality of pins penetrates into the graphite sheet,
 e. attaching the grip of the adaptor to the pipe such that the grip embraces the pipe, further;
 f. providing the attachment with appropriate thermal contact,
 g. coupling the pipe to heat utilization system,
 h. circulating a heat transfer medium through the pipe, the pipe thereby extracting the collected solar heat and transferring it to the heat utilization system.
 i. coupling the pipe to a heat utilizing system.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, alongside all chapters of the present invention, so as to enable any person skilled in the art to make use of said invention and sets forth the best modes contemplated by the inventor of carrying out this invention. Various modifications, however, remain apparent to those skilled in the art, since the generic principles of the present invention have been defined specifically to provide a solar energy collecting assembly.

The term 'Heat transfer medium' refers hereinafter in a non-limiting manner to cooling fluids, for example water, including water with additives, like corrosion inhibitors and antifreezes, and mineral oils, silicone oils, fluorocarbon oil, and refrigerants as well as gases, for example inert gases, nitrogen, carbon dioxide, sulfur hexafluoride.

The term "crenulated edge" refers to a particular embodiment, but can be used interchangeably with any conveniently shaped edge.

The term "plane housing" hereinafter refers to a housing for enclosing fluid channels formed essentially by two parallel plates as exemplified in a non limiting manner, by FIGS. 5a and 5b.

The suggested technical solution can be used for heat exchange between heat transfer medium and air surrounding graphite sheets. Heat transfer direction can be both from heat transfer medium to air and from in an opposite direction. Thus this device can be used both as a heater and as a cooler.

Figure 1A:
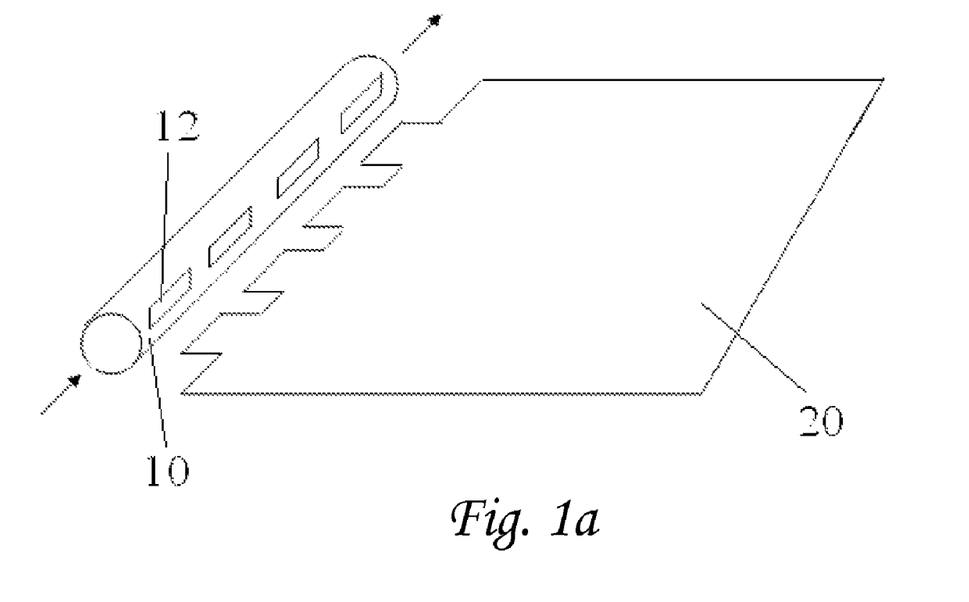
FIG. 1a is an isometric exploded view of the solar energy collecting assembly according to an embodiment comprising a heat transfer medium pipe having slit-like ports and a graphite sheet having a crenulated edge.
Figure 1B:
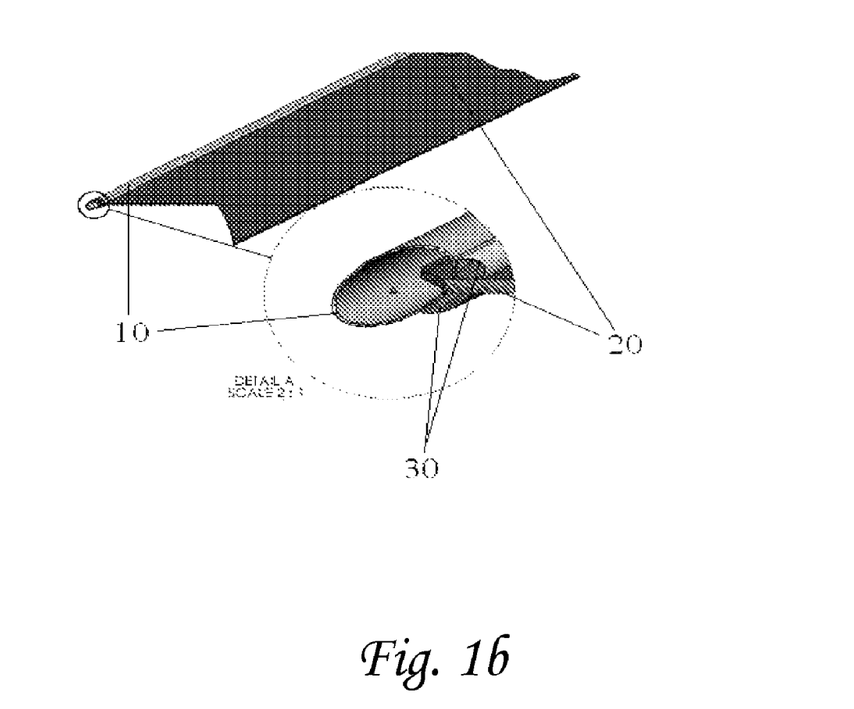
FIG. 1b is an isometric general view of the solar energy collecting assembly according to the embodiment comprising a heat transfer medium pipe having slit-like ports and a graphite sheet having a crenulated edge.

Reference is now made to FIG. 1a and FIG. 1b, of one embodiment of the invention, schematically illustrating a solar energy collecting assembly comprising a heat transfer medium pipe 10, having slit-like ports 12 and a graphite sheet 20 having a crenulated edge with vanes 22. After assembly a commissure is provided, and the assembly is then sealed by caulking 30.

Figure 2A:
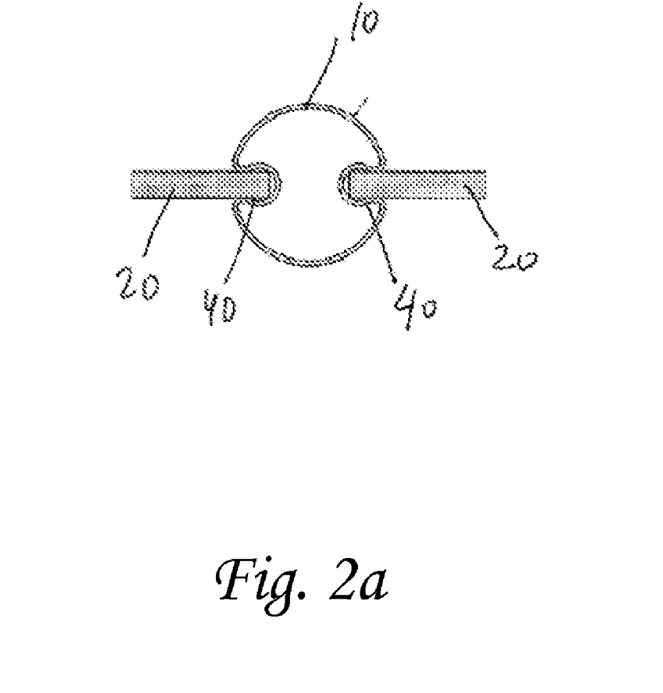
FIG. 2a is a cross-section view of the solar energy collecting assembly according to the embodiment comprising a graphite sheet and a heat transfer medium pipe having invaginations located along a heat transfer medium pipe.
Figure 2B:
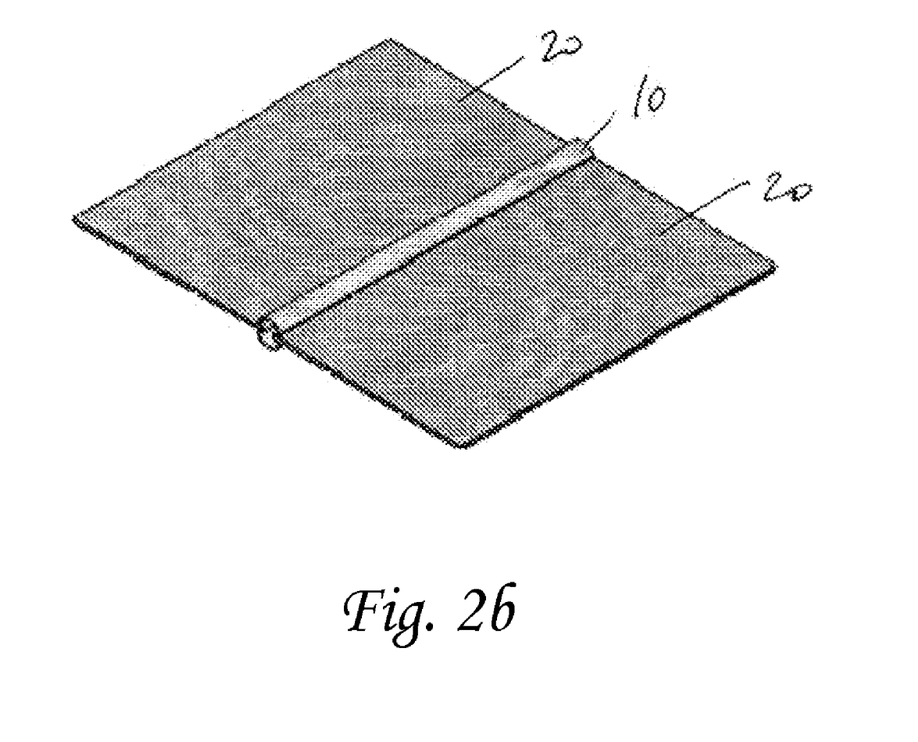
FIG. 2b is an isometric general view of the solar energy collecting assembly according to the embodiment comprising a graphite sheet and a heat transfer medium pipe having invaginations located along a heat transfer medium pipe.

Reference is now made to FIG. 2a and FIG. 2b, of another possible embodiment of the invention, schematically illustrating a collecting assembly comprising a graphite sheet 20 and a heat transfer medium pipe 10 having invaginations 40 disposed along a heat transfer medium pipe.

Figure 3A:
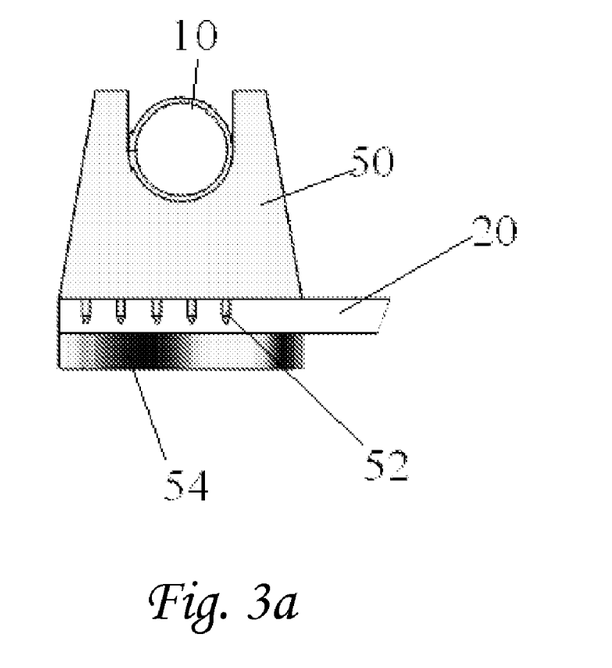
FIG. 3a is a cross-section view of the solar energy collecting assembly according to the embodiment comprising a heat transfer medium pipe, a graphite sheet, and an adaptor disposed between a graphite sheet and a heat transfer medium pipe and having pins penetrating into a graphite sheet.
Figure 3B:
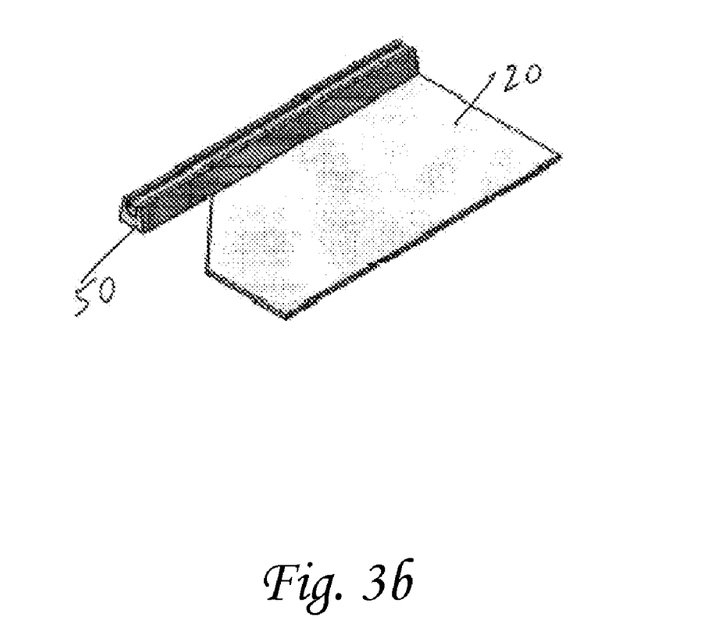
FIG. 3b is an isometric general view of the solar energy collecting assembly according to the embodiment comprising a heat transfer medium pipe, a graphite sheet, and an adaptor disposed between a graphite sheet and a heat transfer medium pipe and having pins penetrating into a graphite sheet.

Reference is now made to FIG. 3a and FIG. 3b, of yet another embodiment of the invention, schematically illustrating a solar energy collecting assembly comprising a heat transfer medium pipe 10, a graphite sheet 20, and an adaptor 50 between them. The adaptor is furnished with pins 52 that penetrate into the graphite sheet 20 for providing enhanced heat transfer. The graphite sheet 20 is bolted down by a plate 54. The bolts are not shown in the Figs.

Figure 4A:
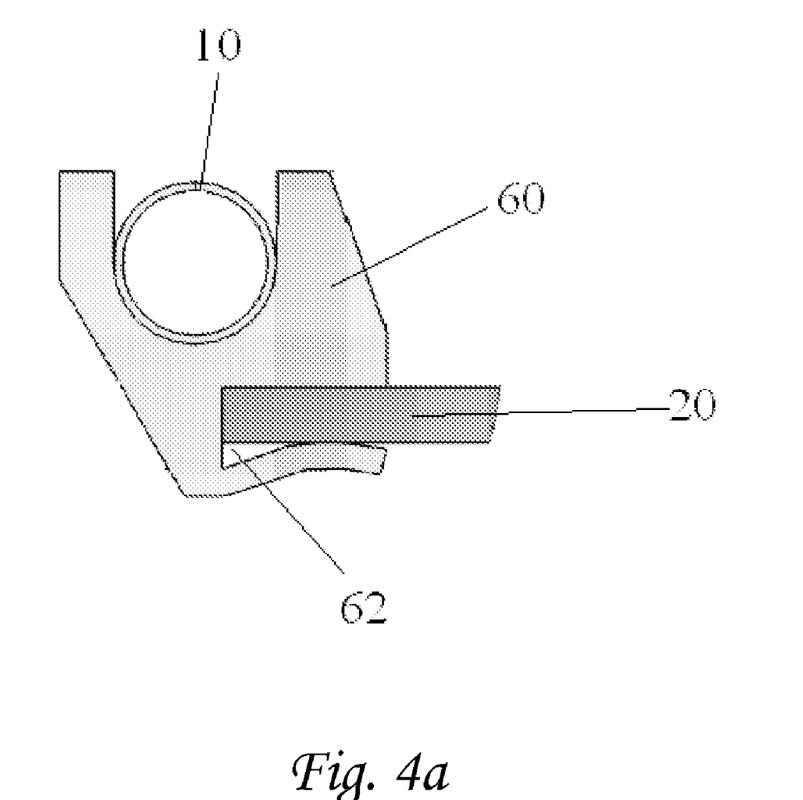
FIG. 4a is a cross-section view of the solar energy collecting assembly according to an embodiment comprising a heat transfer medium pipe, a graphite sheet, and an adaptor disposed between a graphite sheet and a heat transfer medium pipe and having a slot adapted to hold the graphite sheet.
Figure 4B:
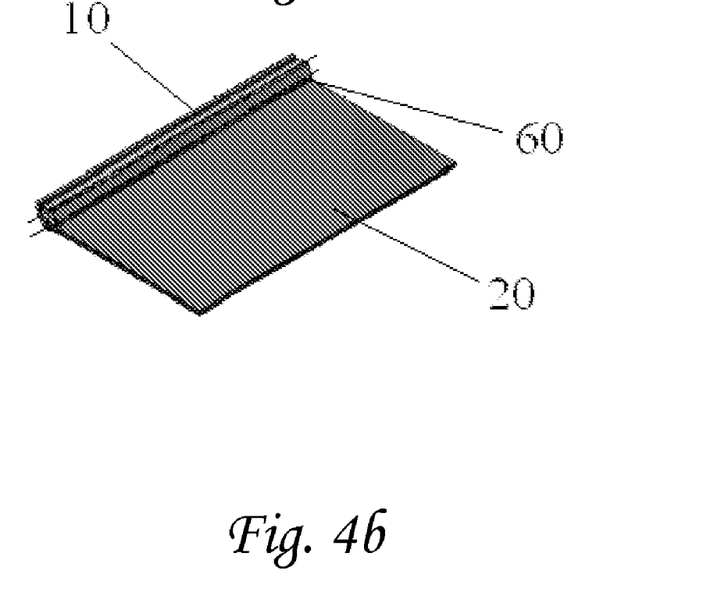
FIG. 4b is an isometric general view of the solar energy collecting assembly according to the embodiment comprising a heat transfer medium pipe, a graphite sheet, and an adaptor disposed between a graphite sheet and a heat transfer medium pipe and having a slot adapted to hold the graphite sheet.

Reference is now made to FIG. 4a and FIG. 4b, of a further embodiment of the invention, schematically illustrating a solar energy collecting assembly comprising heat transfer medium pipe 10, a graphite sheet 20, and an adaptor 60 between them. The adaptor is furnished with a slot 62 adapted to hold the graphite sheet 20.

Figure 5A:
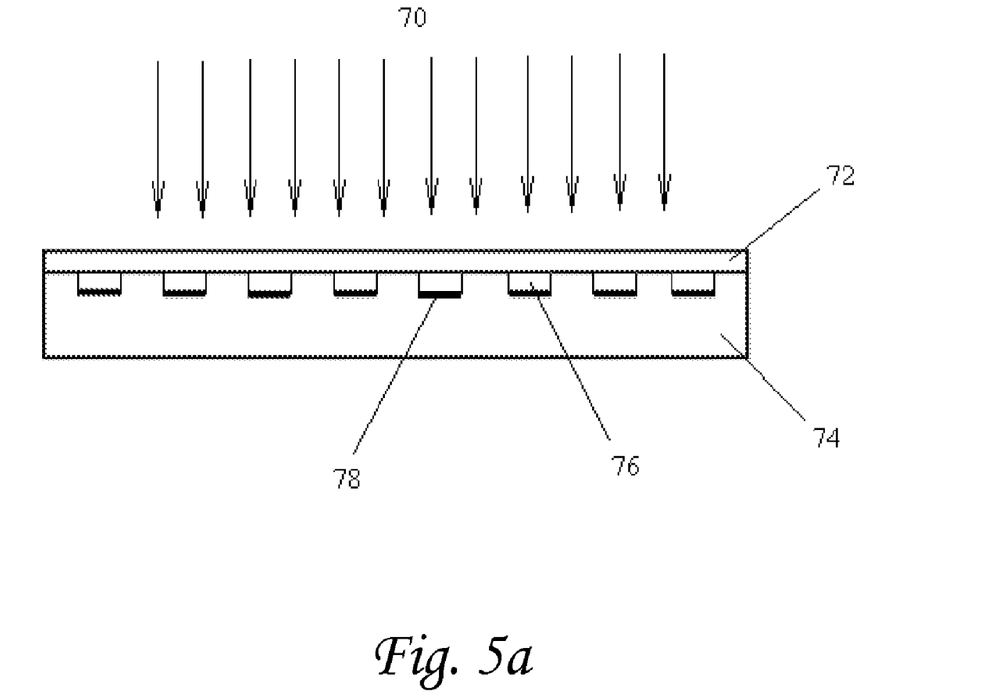
FIG. 5a is a schematic view of the solar energy collecting assembly according to the embodiment comprising metal and plastic plates.
Figure 5B:
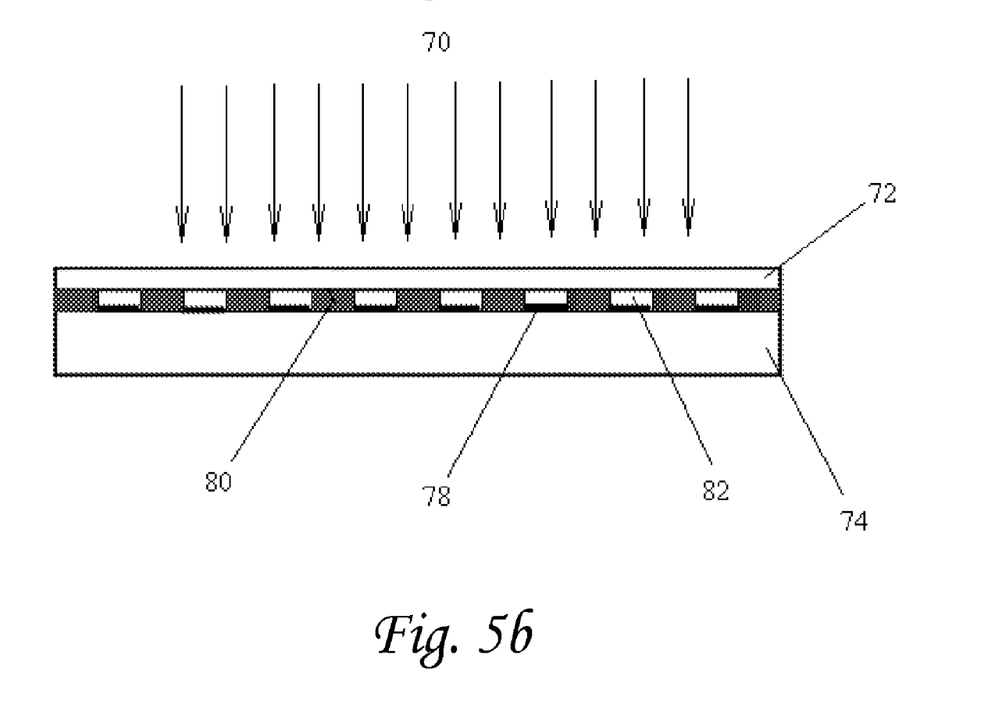
FIG. 5b is a schematic view of the solar energy collecting assembly according to the embodiment comprising metal and plastic plates with graphite spacers between them.

Reference is now made to FIG. 5a and FIG. 5b, of further embodiments of the invention, schematically illustrating a solar energy collecting assembly comprising metal and plastic plates 72 and 74, respectively. Solar rays 70 are incident on the metal plate 72 and heat the heat transfer agent flowing in the grooves 76. In accordance with the embodiment of the invention shown in FIG. 5a, the metal plate 72 is directly attached to the plastic plate 74. Channels for heat transfer agent flowing are formed by the grooves 76 and metal plate 72. An inner surface 78 of the grooves 76 is sufficiently rough to provide turbulence in heat transfer agent flow. In the embodiment of the invention shown in FIG. 5b, the channels 82 for heat transfer agent flow are formed by means of graphite spacers 80. The inner plastic surface 78 is similar sufficiently rough to provide turbulence in heat transfer agent flow.

Figure 6A:
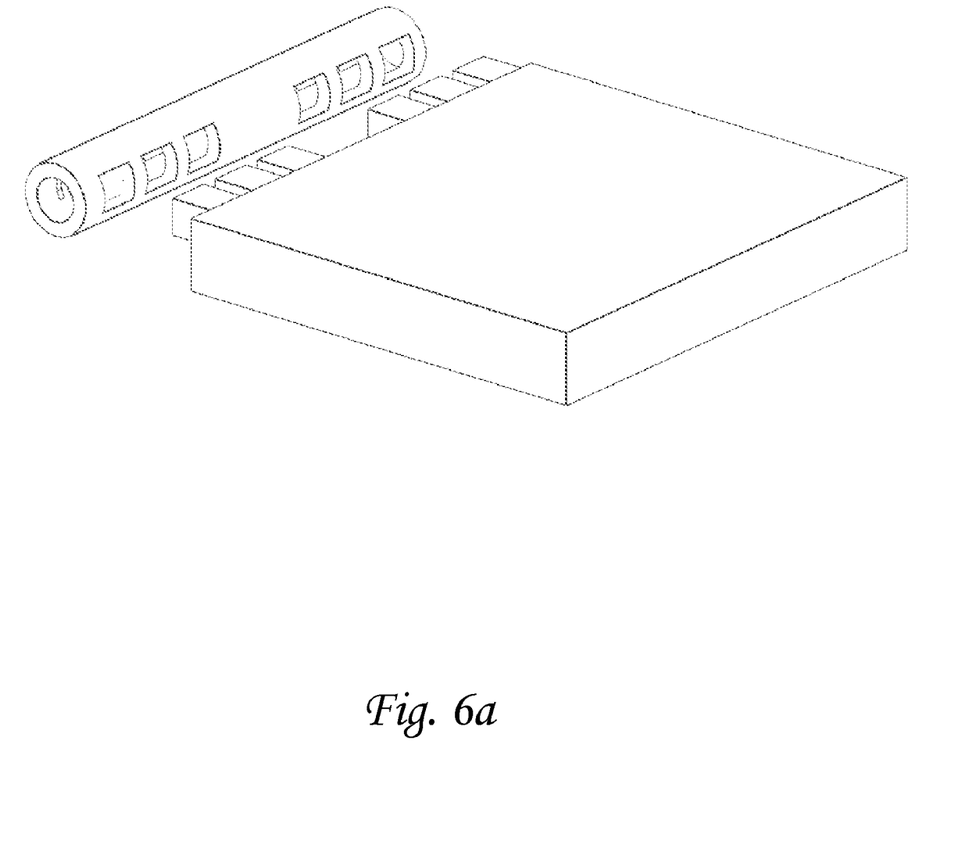
FIG. 6a is an isometric exploded view of the solar energy collecting assembly according to an embodiment comprising a heat transfer medium pipe having slit-like ports and a plane shaped solar collector having a crenulated input/output nipples.

Reference is now made to FIG. 6a, of further embodiment of the invention, schematically illustrating a solar energy collecting assembly comprising a heat transfer medium pipe 10, having slit-like ports 12 and a plane housing 90 having crenulated input/output nipples.

Figure 6B:
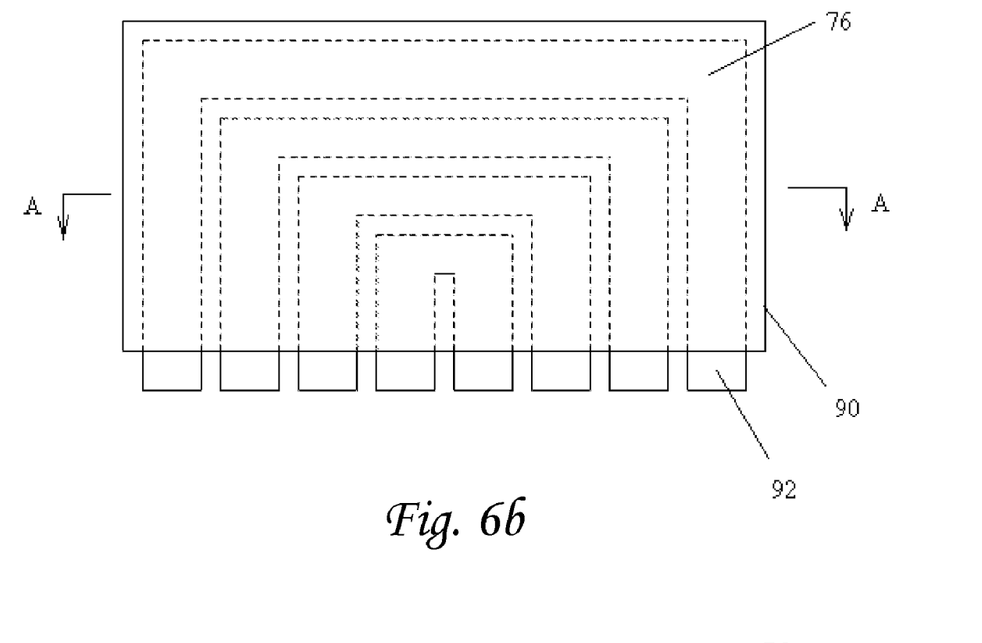
FIG. 6b is a schematic view of a plane shaped solar collector formed by two metal plates spaced by graphite spaces.
Figure 6C:
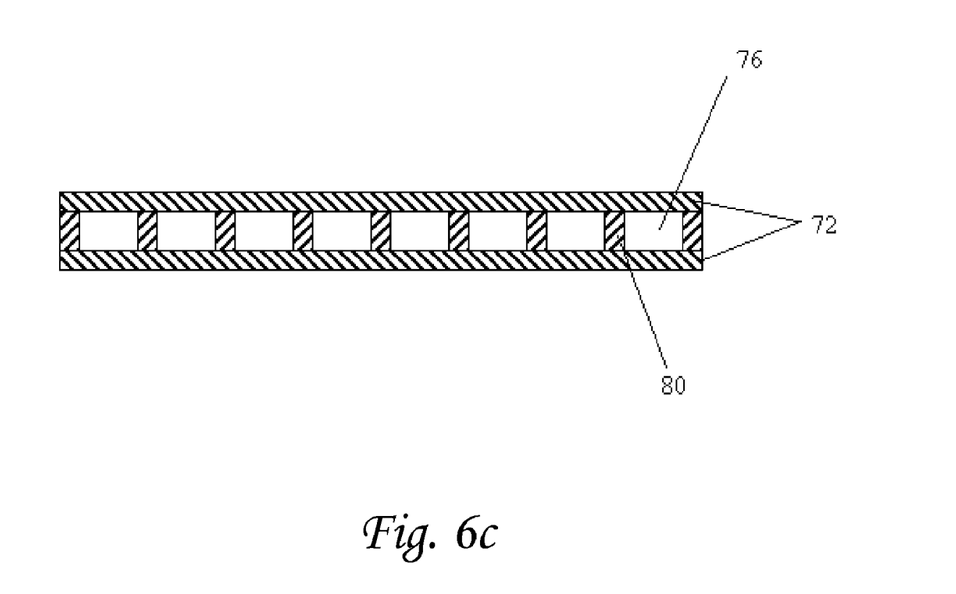
FIG. 6c is a cross-section view of a plane shaped solar collector formed by two metal plates spaced by graphite spaces.

Reference is now made to FIG. 6b-6c, of further embodiment of the invention schematically illustrating a plane housing formed 90 formed by two heat conducting metal plates 72 spaced by graphite spacers 80. Graphite spacers 80 are adapted to provide passages for heat transfer agent. Each passage is furnished with input and output ports 92. Dashed lines indicate the heat transfer agent passages.

Figure 6D:
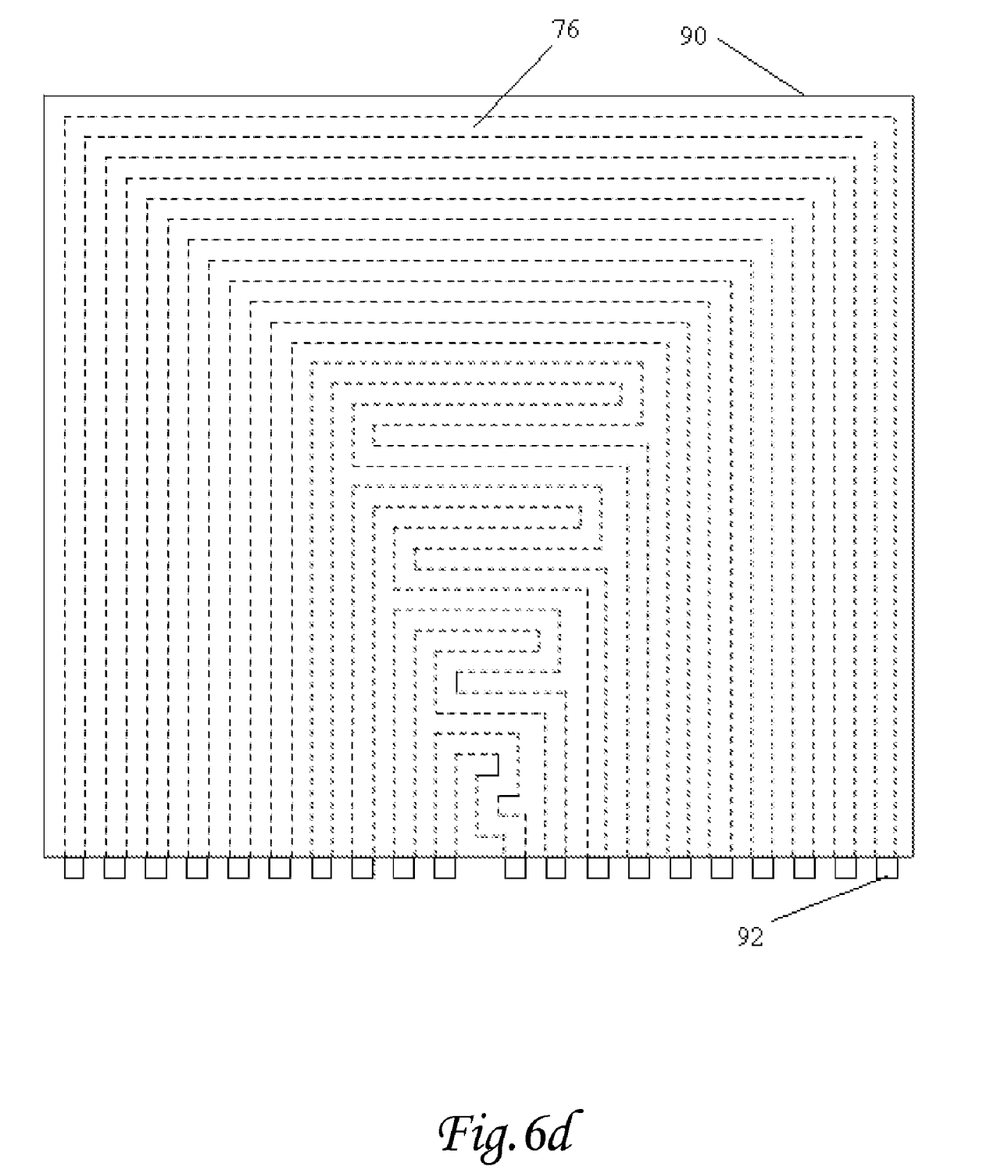
FIG. 6d is a schematic view of a plane shaped solar collector formed by two graphite sheets with grooves adapted to form heat transfer agent passages.

Reference is now made to FIG. 6d, of further embodiment of the invention schematically illustrating a plane housing formed 90 formed by two graphite sheets having special grooves adapted to provide passages for heat transfer agent. Each passage is furnished with input and output ports 92. Dashed lines indicate the heat transfer agent passages.

In accordance with the embodiment of the invention, the heat transfer medium pipe 10 coupled to a heat utilizing system furnished with the slit-like ports 12. Solar radiation absorbed by the graphite sheets 20 is converted into heat. Solar heat is transferred along the crystalline surface of the graphite sheets 20 to a heat transfer medium circulating in the heat transfer medium pipe 10.

As can be seen in FIG. 1a and 1b, the graphite sheet 20 has a plurality of vanes 22 at its edge corresponding to the slit-like ports 12. The vanes 22 are housed in the slit-like ports 12 and sealed by caulking 30.

The vanes 22 protrude into the heat transfer medium pipe 10 thereby enhancing the heat transfer rate for the following reasons. Firstly, an area of contact is increased because the heat transfer medium laves the protruded vanes 22. Secondly, the protruberance of the vane 22 into the heat transfer medium pipe 10 results in turbulent flow in the heat transfer medium pipe 10. As is well known, turbulence increases heat exchange efficiency between heated surfaces and the heat transfer medium.

Referring to FIGS. 2a and 2b in accordance with this embodiment of the invention, the heat transfer medium pipe is furnished with the elongated invaginations 40 located along the heat transfer medium pipe 10. Solar heat converted from solar radiation by the graphite sheets 20 is transferred from them to the heat transfer medium circulating in the heat transfer medium pipe 10. The invaginations are adapted to hold the graphite sheets 20. Disposing the graphite sheets 20 into the invaginations 40 extends the area of thermal contact between the graphite sheets 20 and the heat transfer medium pipe 10.

This is a novel advance on the prior art because the invaginations 40 additionally embrace a part of the side surface of the graphite sheets 20 that in turn enhances an area of thermal contact and heat transfer velocity.

In accordance with a further embodiment of the invention (FIGS. 3a and 3b), the adaptor 50 is disposed between the graphite sheet 20 and the heat transfer medium pipe 10. The adaptor 50 is made of a material with high thermal conductivity and thermally joins the graphite sheet 20 to the heat transfer medium pipe 10. Additionally, the adaptor 50 is furnished with the plurality of the pins 52. The pins 52 protrude into the graphite sheet to provide enhanced heat transfer from the graphite sheet 20 to the heat transfer medium pipe 10.

Solar heat converted from solar radiation by the graphite sheets 20 is transferred from the sheets 20 to the heat transfer medium circulating in the heat transfer medium pipe 10. The pins 52 penetrate into the graphite sheets 20 and extract converted solar heat. Since the pins are in thermal contact with the adaptor 50, the pins 52 transfer heat to the adaptor 50 and further to the heat transfer medium in the pipe 10. Increase of heat transfer results from extracting converted heat from the whole thickness of the graphite sheets 20.

In accordance with the embodiment of the invention shown in FIGS. 4a and 4b the adaptor 60 is disposed between the graphite sheet 20 and the heat transfer medium pipe 10. The adaptor 60 is made of a material with high thermal conductivity and thermally joins the graphite sheet 20 to the heat transfer medium pipe 10. Additionally, the adaptor 60 is furnished with the slot 62 adapted to hold the graphite sheet 20. An arrangement of the slot 62 is adapted to be in thermal contact with an end surface of the graphite sheet 20. Heat collected by the graphite sheet 20 transfers to the heat transfer medium flowing in the pipe 10. The thermal contact of the end surface of the graphite sheet 20 with the adaptor 60 and embracing a part of side surface of the graphite sheet 20 provides maximum effective heat transfer.

In accordance with the embodiment of the invention shown in FIG. 5a solar light heats the metal plate 72. This plate 72 has preferably light gauge (about 0.1 mm) and is coated with coatings absorbing solar rays. Heat absorbed by the plate 72 transfers to the heat transfer agent flowing in the channels formed by the grooves 76 and the plate 72. The inner surface 78 of the grooves 76 has sufficient roughness to create turbulence in heat transfer agent flow.

In accordance with the embodiment of the invention shown in FIG. 5b the graphite spacers 80 are introduced between the metal plate 72 and the plastic plate 74. The graphite spacers 80 form channels 82 for heat transfer agent flow. The inner surface 76 of the plastic plate 74 is rough. Turbulence provided by roughness of the plastic surface 76 enhances efficiency of heat transfer. The embodiments of the invention shown in FIGS. 5a and 5b are very cost effective due to high efficiency of heat transfer and low cost.

Thus, the proposed technical solutions enable efficient heat transfer from the graphite sheet 20 to the heat transfer medium flowing in the pipe 10 by conductivity due to enhancement of the thermal contact area between them.

Efficient means and methods of extraction of converted heat from solar collecting devices, as exemplified above, has therefore fulfilled a long felt need.

It will be appreciated that the above described methods may be varied in many ways including, changing the order of steps, and/or performing a plurality of steps concurrently.

It should also be appreciated that the above described description of devices and methods are to be interpreted as including apparatus for carrying out the methods, and methods of using the devices, of any type as well known to a person of ordinary skill, and which need not be described in detail herein for enabling a person of ordinary skill to practice the invention, since such a person is well versed in engineering and thermodynamics.

For the main embodiments of the invention, the particular selection of type and model is not critical, though where specifically identified, this may be relevant. The present invention has been described using detailed descriptions of embodiments thereof that are provided by way of example and are not intended to limit the scope of the invention. No limitation, in general, or by way of words such as "may", "should", "preferably", "must", or other term denoting a degree of importance or motivation, should be considered as a limitation on the scope of the claims or their equivalents unless expressly present in such claim as a literal limitation on its scope. It should be understood that features and steps described with respect to one embodiment may be used with other embodiments and that not all embodiments of the invention have all of the features and/or steps shown in a particular figure or described with respect to one of the embodiments. That is, the disclosure should be considered complete from combinatorial point of view, with each embodiment of each element considered disclosed in conjunction with each other embodiment of each element (and indeed in various combinations of compatible implementations of variations in the same element). Variations of embodiments described will occur to persons of the art. Furthermore, the terms "comprise," "include," "have" and their conjugates, shall mean, when used in the claims, "including but not necessarily limited to." Each element present in the claims in the singular shall mean one or more element as claimed, and when an option is provided for one or more of a group, it shall be interpreted to mean that the claim requires only one member selected from the various options, and shall not require one of each option. The abstract shall not be interpreted as limiting on the scope of the application or claims.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

The invention claimed is:

1. A thermal device for heating and/or cooling surrounding air comprising; (a) at least one graphite sheet; (b) at least one pipe containing a thermal transfer medium; (c) a heating/cooling system in thermal connection with said at least one pipe; wherein an end surface of said at least one graphite sheet and said at least one pipe are thermally coupled to one another such that heat can be transferred back and forth between said graphite sheet and said thermal transfer medium of said at least one pipe, as controlled by said heating/cooling system; wherein said at least one pipe is furnished with slit ports, and wherein said end surface of said at least one graphite sheet is crenulated such that elements of said crenulated surface are adapted to protrude into said pipe at said ports, thereby providing a relatively high degree of thermal contact and increasing turbulence inside of said pipe.

2. A solar energy collecting assembly useful for transferring solar heat to a heat utilizing system via heat transfer fluid flow, comprising; (a) at least one graphite sheet for collecting solar energy, wherein said graphite sheet is anisotropic; (b) at least one pipe containing a heat transfer fluid and connected to a heat utilizing system; wherein an end surface of said at least one graphite sheet and said at least one pipe are thermally coupled to one another such that solar heat from said graphite sheet is effectively transferred to said heat transfer fluid of said at least one pipe; wherein said at least one pipe is furnished with slit ports, and wherein said end surface of said at least one graphite sheet is crenulated such that elements of said crenulated surface are adapted to protrude into said pipe at said ports, thereby providing a relatively high degree of thermal contact and increasing turbulence inside of said pipe.

3. A method useful for extracting collected solar heat and transferring said heat to a heat utilization system, wherein said method comprises the steps of a. obtaining at least one graphite sheet, said sheet anisotropically conductive along crystalline plane for collecting solar heat, b. obtaining at least one pipe containing a heat transfer fluid, wherein said at least one graphite sheet, and said at least one pipe, are configured for being thermally coupled with one another so as to allow effective transfer of heat between said at least one graphite sheer and said thermal transfer fluid of said at least one pipe c. thermally coupling said at least one graphite sheet with said at least one pipe; d. connecting said pipe to a heat utilization system, e. circulating a heat transfer medium through said pipe, thereby effectively extracting said collected solar heat from said graphite sheet and transferring heat to said heat utilization system; wherein said at least one pipe is furnished with slit ports, and wherein said end surface of said at least one graphite sheet is crenulated such that elements of said crenulated surface are adapted to protrude into said pipe at said ports, thereby providing a relatively high degree of thermal contact and increasing turbulence inside of said pipe.

* * * * *